United States Patent
Zhou et al.

(10) Patent No.: US 9,206,353 B2
(45) Date of Patent: Dec. 8, 2015

(54) METAL NANO PARTICLES DOPED WITH SILICATE LUMINESCENT MATERIALS AND PREPARATION METHODS THEREOF

(75) Inventors: Mingjie Zhou, Shenzhen (CN); Rong Wang, Shenzhen (CN); Chaopu Shi, Shenzhen (CN); Wenbo Ma, Shenzhen (CN)

(73) Assignee: Ocean's King Lighting Science & Technology Do., Ltd., Shenzhen (CN)

( * ) Notice: Subject to any disclaimer, the term of this patent is extended or adjusted under 35 U.S.C. 154(b) by 264 days.

(21) Appl. No.: 13/812,908

(22) PCT Filed: Jul. 30, 2010

(86) PCT No.: PCT/CN2010/075577
§ 371 (c)(1),
(2), (4) Date: Jan. 29, 2013

(87) PCT Pub. No.: WO2012/012947
PCT Pub. Date: Feb. 2, 2012

(65) Prior Publication Data
US 2013/0126785 A1 May 23, 2013

(51) Int. Cl.
C09K 11/00 (2006.01)
C09K 11/87 (2006.01)
C09K 11/77 (2006.01)

(52) U.S. Cl.
CPC ............. *C09K 11/87* (2013.01); *C09K 11/7734* (2013.01)

(58) Field of Classification Search
CPC .................................. C09K 11/87; C09K 11/77
See application file for complete search history.

(56) References Cited

U.S. PATENT DOCUMENTS

2005/0264161 A1* 12/2005 Oaku et al. ..................... 313/486
2006/0261309 A1* 11/2006 Li et al. ..................... 252/301.4 F

OTHER PUBLICATIONS

Song et al., "Synthesis of Sr2MgSi2O7:Eu, Dy and Sr2MgSi2O7:Eu, Dy, Nd by a modified solid-state reaction and their luminescent properties," 2008, Journal of Alloys and Compounds 458, pp. 564-568.*

* cited by examiner

*Primary Examiner* — Robert Vetere
(74) *Attorney, Agent, or Firm* — Locke Lord, LLP

(57) ABSTRACT

Metal nano particles doped with silicate luminescent materials and preparation methods thereof are provided. The luminescent materials are represented by the general formula: $(Sr_{1-x-y}A_xEu_y)_3SiO_5:Dz@M_n$, wherein A is one or two selected from alkaline-earth metal elements, D is F or Cl, @ is for coating, M is one or two selected from Ag, Au, Pt, Pd or Cu metal nano particles, $0 \leq x \leq 0.5$, $0.001 < y \leq 0.15$, and $0 \leq z \leq 0.5$. n is a molar ratio of metal nano particles to the silicon element, wherein $0 < n \leq 0.01$. Compared to the luminescent materials in the art, the said luminescent materials have higher internal quantum efficiency, luminous intensity and stability, therefore they are appropriate to be used in coating technique and improve the visual effect.

7 Claims, 2 Drawing Sheets

METAL NANO PARTICLES DOPED WITH SILICATE LUMINESCENT MATERIALS AND PREPARATION METHODS THEREOF

TECHNICAL FIELD

The present invention relates to a luminescent material and the preparation method thereof, and particularly, to a metal nanoparticles doped silicate luminescent material and the preparation method thereof.

BACKGROUND

As a new type of solid light source, white light LED has the advantages of energy-saving, environmental protection, long life, small size and the like, thus it has great application prospects in the fields of lighting and display. There are two types of white light LEDs: the first one is consisted of three LEDs: red, blue, and green; the second one is composed of LED chip and the phosphor powder coated thereon. Because the cost of the first type is high, and the light color thereof is not easy to control, the second type is now widely employed the manufacturing method of the white light LED composed of a blue light LED chip and a yellow phosphor powder which may be excited by blue light is simple, the luminous efficiency of the product is high, thereby it is the preferred product to implementation of white light LED, wherein the yellow phosphor powder is mainly composed of YAG fluorescent powder.

The silicate phosphor powder is also a good yellow phosphor powder. Compared to the YAG phosphor powder, the excitation spectrum of the silicate phosphor powder is wider, and has a better color purity, but this phosphor powder has the problem of low luminous efficiency. However, further improving the luminescent properties of the material is the target of the researchers.

SUMMARY

The technical problem to be dissolved by the present invention is to provide a metal nanoparticles doped silicate luminescent material and the preparation method thereof.

The technical problems of the present invention can be solved through the following technical solutions: a metal nanoparticles doped silicate luminescent material is provided, the general formula thereof is $(Sr_{1-x-y}A_xEu_y)_3SiO_5:D_z@M_n$, wherein A is one or two selected from alkaline earth metal elements, D is F or Cl, @ represents coating, M is metal nanoparticle, and the metal is one or two selected from the group consisting of Ag, Au, Pt, Pd or Cu metal nanoparticles, the value of x is: $0 \le x \le 0.5$, the value of y is: $0.001 < y \le 0.15$, the value of z is: $0 \le z \le 0.5$, n is the molar ratio of the metal nanoparticles to the silicon elements, and the value of n is: $0 < n \le 0.01$.

In the luminescent material of the present invention, the A is one or more selected from the group consisting of Ba, Ca, Mg and Zn. Preferably, the value of x is: $0.05 \le x \le 0.3$; the value of y is: $0.01 \le y \le 0.1$, the value of z is: $0.01 \le z \le 0.13$; the value of n is: $1 \times 10^{-4} \le n \le 5 \times 10^{-3}$.

Furthermore, the preparation method of a metal nanoparticles doped silicate luminescent material is provided, wherein the preparation method comprises:

step 1: a metal salt solution, an additive and a reductant together are mixed together and react with each other to obtain a metal nanoparticle colloid, wherein the metal is one or two selected from the group consisting of Ag, Au, Pt, Pd, and Cu;

step 2: the metal nanoparticle colloid is subjected to surface treatment by adding a solution containing a surface treating agent thereto, then an absolute ethanol, a deionized water, an aqueous ammonia, and a tetraethyl orthosilicate are added to the solution to prepare a coating $SiO_2$ nanospheres, and the acidity of the solution is adjusted to pH5;

step 3: a nitrate solution of Sr, A, and Eu, as well as a nitric acid solution or aqueous solution of $SrD_2$ or $AD_2$ are added into the final solution obtained in step 2 in accordance with the stoichiometric ratio of the corresponding elements in the general formula $(Sr_{1-x-y}A_xEu_y)_3SiO_5:D_z@M_n$ wherein A is one selected from alkaline earth metal elements, D is F or Cl, the value of x is: $0 \le x \le 0.5$, the value of y is: $0.001 < y \le 0.15$, the value of z is: $0 \le z \le 0.5$, then a precipitating agent is added, after stirring the precipitate is dried to obtain the precursor;

step 4: the precursor is subjected to heat treatment and reduction treatment, and then it is cooled to give the metal nanoparticles doped silicate luminescent material.

In step 1 of the preparation method according to the present invention, the additives are one or more selected from the group consisting polyvinylpyrrolidone, sodium citrate, cetyl trimethyl ammonium bromide, sodium dodecyl sulfate and sodium dodecyl sulfonate, and the additive is added in such an amount that the content thereof in the final metal nanoparticle colloid is in the range of $1 \times 10^{-4}$ g/ml to $5 \times 10^{-2}$ g/ml. The reductant is one or more selected from the group consisting of hydrazine hydrate, ascorbic acid, sodium citrate, and sodium borohydride, and the reductant is added in such an amount that the molar ratio of the reductant to the metal ions is in the range of 3.6:1 to 18:1.

In the solution containing a surface treating agent of step 2, the surface treating agent is polyvinyl pyrrolidone, the solvent is water, and the concentration of the surface treating agent is in the range of 0.005 to 0.1 g/ml.

The precipitating agent in step 3 is ammonium carbonate, and the ammonium carbonate is in excess of 25% in the amount of substance in the solution of step 3.

The heat treatment in step 4 is that the precursor being placed in a muffle furnace at 600° C. to 1000° C. for 2 to 10 hours. In step 4, the reduction treatment is that the heat treated precursor being reduced at 1300° C. to 1600° C. for 1 to 8 hours in a reducing atmosphere, and the reducing atmosphere is one or more selected from the group consisting of a mixed gas of nitrogen and hydrogen, carbon monoxide, and pure hydrogen.

Compared to the prior art, in the silicate luminescent material and the preparation method thereof according to the present invention, the core-shell structure of the luminescent material is formed by coating metal particles, which improves the internal quantum efficiency of the luminescent material, and the added metal nanoparticles enhances its luminous intensity, furthermore the luminescent material has good stability, and has a spherical profile, and the size, profile thereof is controllable, the spherical profile has a higher bulk density, which facilitates the process of coating screen and improves the display effect of the coated screen; additionally, the present method employs the process of precipitation, which lowers the temperature of the synthesis reaction, and the process for preparation is simple, low equipment requirements, pollution-free, easy to control, thus has broad prospects for production applications.

BRIEF DESCRIPTION OF THE DRAWINGS

The present invention will be described in detail with reference to the following Figures and embodiments, wherein.

DETAILED DESCRIPTION OF THE PREFERRED EMBODIMENTS

Objects, embodiments and advantages of the present invention will be explained below in detail with reference to the figures and embodiments. However, it should be appreciated that the following description of the embodiments is merely exemplary in nature and is no way intended to limit the invention.

The present invention provides a metal nanoparticles doped silicate luminescent material, the general formula thereof is:$(Sr_{1-x-y}A_xEu_y)_3SiO_5:D_z@M_n$, wherein A is one or two selected from alkaline earth metal elements, D is F or Cl, @ represents coating, M is metal nanoparticle, and the metal is one or two selected from the group consisting of Ag, Au, Pt, Pd and Cu metal nanoparticles, the value of x is:$0 \leq x \leq 0.5$, the value of y is: $0.001 < y \leq 0.15$, the value of z is: $0 \leq z \leq 0.5$, n is the molar ratio of the metal nanoparticles to the silicon elements, and the value of n is: $0 < n \leq 0.01$. The coating means that the metal nanoparticle being as the core, and the $(Sr_{1-x-y}A_xEu_y)_3SiO_5:D_z$ phosphor powder being as the shell.

In the luminescent material of the present invention, the A is one or more selected from the group consisting of Ba, Ca, Mg and Zn. Preferably, the value of x is: $0.05 \leq x \leq 0.3$; the value of y is: $0.01 \leq y \leq 0.1$, the value of z is: $0.01 \leq z \leq 0.13$; the value of n is: $1\times10^{-4} \leq n \leq 5\times10^{-3}$.

Figure 1:
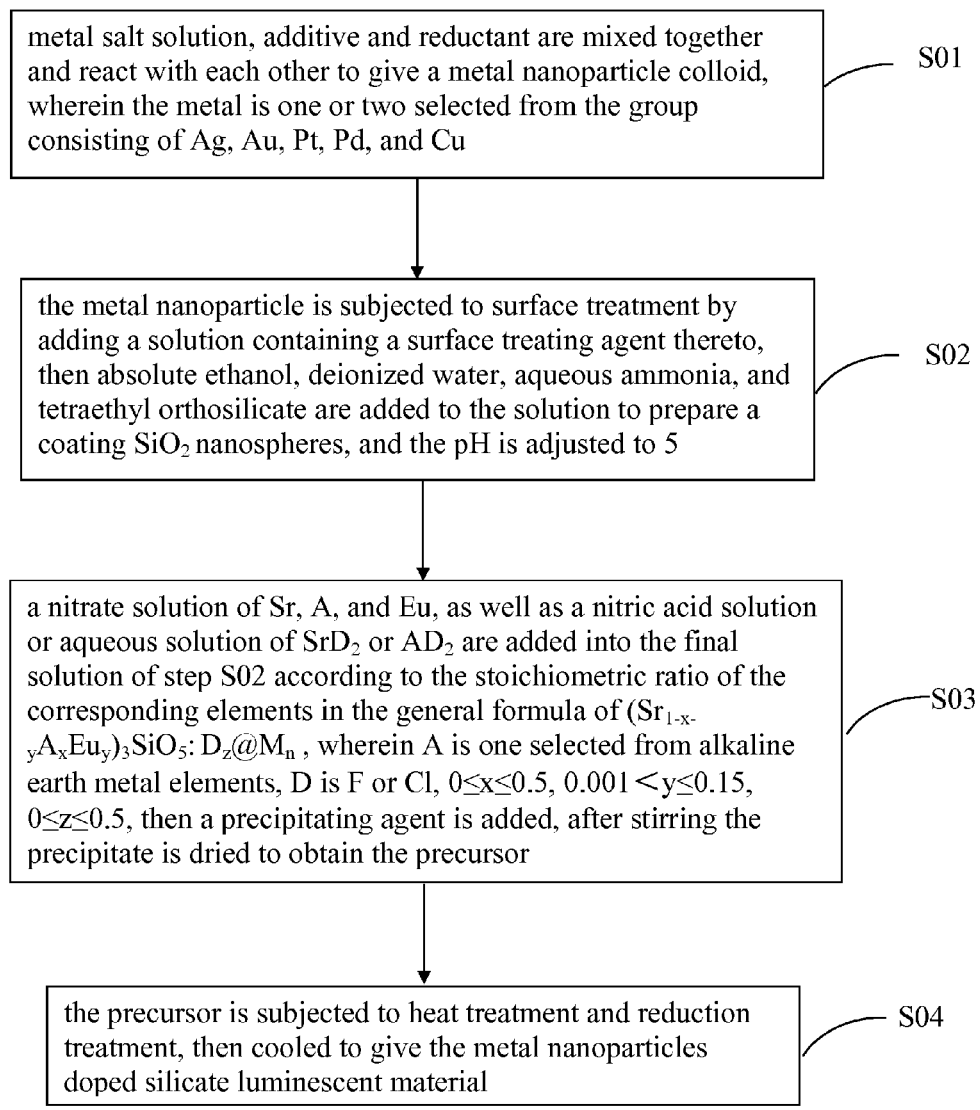
FIG. 1 is a flow chart of preparation method of the a metal nanoparticles doped silicate luminescent material of the present invention.

Referring to FIG. 1, FIG. 1 shows the flow of the preparation method of the a metal nanoparticles doped silicate luminescent material of the present invention, which comprises:

step S01: a metal salt solution, an additive and a reductant are mixed together and react with each other to give a metal nanoparticle colloid, wherein the metal is one or two selected from the group consisting of Ag, Au, Pt, Pd, and Cu;

step S02: the metal nanoparticle colloid is subjected to surface treatment by adding a solution containing a surface treating agent thereto, then an absolute ethanol, a deionized water, an aqueous ammonia, and tetraethyl orthosilicate are added to the solution to prepare a coating $SiO_2$ nanospheres, and the acidity of the resulted solution is adjusted to pH 5;

step S03: a nitrate solution of Sr, A, and Eu, as well as a nitric acid solution or aqueous solution of $SrD_2$ or $AD_2$ are added into the final solution obtained in step S02 in accordance with the stoichiometric ratio of the corresponding elements in the general formula of $(Sr_{1-x-y}A_xEu_y)_3SiO_5:D_z@M_n$ wherein A is one selected from alkaline earth metal elements, D is F or Cl, the value of x is: $0 \leq x \leq 0.5$, the value of y is: $0.001 < y \leq 0.15$, the value of z is: $0 \leq z \leq 0.5$, then a precipitating agent is added, after stirring the precipitate is dried to obtain the precursor;

step S04: the precursor is subjected to heat treatment and reduction treatment, then it is cooled to give the metal nanoparticles doped silicate luminescent material.

In step S01 of the preparation method of the present invention, the additive is one or more selected from the group consisting of polyvinylpyrrolidone, sodium citrate, cetyl trimethyl ammonium bromide, sodium dodecyl sulfate and sodium dodecyl sulfonate, and the additive is added in such an amount that the content thereof in the final metal nanoparticle colloid is in the range of $1\times10^{-4}$ g/ml to $5\times10^{-2}$ g/ml. The reductant is one or more selected from the group consisting of hydrazine hydrate, ascorbic acid, sodium citrate, and sodium borohydride, and the reductant is added in such an amount that the molar ratio of the reductant to the metal ions is in the range of 3.6:1 to 18:1. Under the premise that the metal nanoparticle colloid could be produced, the reaction time of step S01 is preferably in the range of 10 to 45 min, in order to save energy.

In the solution containing a surface treating agent of step S02, the surface treating agent is polyvinylpyrrolidone, the solvent is water, and the concentration of the surface treating agent is in the range of 0.005 to 0.1 g/ml. The addition of absolute ethanol, deionized water, aqueous ammonia, and tetraethyl orthosilicate sequentially to the metal nanoparticle colloid to prepare the coating $SiO_2$ nanospheres is in accordance with the sol-gel method proposed by Stober et al and to coat with $SiO_2$ nanospheres.

The precipitating agent in step S03 is ammonium carbonate, and the ammonium carbonate is in excess of 25% in the amount of substance in the solution of step S03. Thereby the precipitate is ensured to proceed completely. Following the ammonium carbonate is added in step S03, a white precipitate will form, after the mixture is stirred for a certain time and finished the reaction, the precipitate is dried in the oven to obtain the precursor.

The heat treatment in step S04 is that the precursor being placed in a muffle furnace at 600° C. to 1000° C. for 2 to 10 hours. The reduction treatment is that the heat treated precursor being reduced at 1300° C. to 1600° C. for 1 to 8 hours in a reducing atmosphere, and the reducing atmosphere is one or more selected from the group consisting of a mixed gas of nitrogen and hydrogen, carbon monoxide, and pure hydrogen.

In the silicate luminescent material and the preparation method thereof according to the present invention, the core-shell structure of the luminescent material is formed by coating metal particles, which improves the internal quantum efficiency of the luminescent material, and the addition of metal nano-particles enhances its luminous intensity, furthermore the luminescent material has good stability, and has a spherical profile, and the size, profile thereof are controllable, the spherical profile has a higher bulk density, which facilitates the process of coating screen and improves the display effect of the coated screen; additionally, the present method employs the process of precipitation, which lowers the temperature of the synthesis reaction, and the process for preparation is simple, low equipment requirements, pollution-free, easy to control, thus has broad prospects for production applications.

The different compositions of the metal nanoparticles doped silicate luminescent material, the preparation method and characteristics thereof will be explained in detail referring to following Examples.

Example 1

Preparation Of Platinum (Pt) Nanoparticles Doped material of $(Sr_{0.9}Eu_{0.1})_3SiO_5:Cl_{0.3}@Pt_{0.01}$ At room temperature, 0.30 grams (g) of polyvinylpyrrolidone (PVP) was weighed and dissolved in 6 ml of deionized water, after dissolution 4 ml suspension of $1\times10^{-2}$ mol/L platinum metal nanoparticles were added, the mixture was stirred for 18 hours, then 30 ml of absolute ethanol, 5 ml of aqueous ammonia, 1.0 ml tetraethyl orthosilicate were added successively with stirring; after 6 h of reaction, the pH of the solution was adjusted to 5, then 10.2 ml of 1 mol/L $Sr(NO_3)_2$, 6 ml of 0.2 mol/L $Eu(NO_3)_3$, 3 ml of 0.2 mol/L $SrCl_2$ in aqueous solutions were added, after stirring 30 ml of 0.5 mol/L $(NH_4)_2CO_3$ solution was added dropwise slowly, and the mixture was stirred for another 5 hours, then the obtained precipitate was placed in an oven for drying, it was subjected to heat treatment at 600° C. for 10 h, then placed in an agate mortar and ground until mixed uniformly, and the obtained powder was transferred to an alundum crucible, then sintered at 1600° C. for 1 h in carbon powder reducing atmosphere for reduction, the mixture was cooled to room temperature to give a Pt nanoparticles doped luminescent material of $(Sr_{0.9}Eu_{0.1})_3SiO_5:Cl_{0.3}@Pt_{0.01}$.

Example 2

Preparation Of The Ag Nanoparticles Doped material of $(Sr_{0.98}Eu_{0.02})_3SiO_5@Ag_{0.0005}$ At room temperature, 0.1 g of polyvinyl pyrrolidone was weighed and dissolved in 8 ml of deionized water, after dissolution 2 ml suspension of $1\times10^{-3}$ mol/L Ag metal nanoparticles were added and stirred for 12 h, then 25 ml of absolute ethanol, 6 ml of aqueous ammonia, and 1.0 ml tetraethyl orthosilicate were added successively with stirring; after 3 h of reaction, the pH of the solution was adjusted to 5, then 10.8 ml of 1 mol/L $Sr(NO_3)_2$, and 2.4 ml of 0.1 mol/L $Eu(NO_3)_3$ were added, after stirring 15 ml solution of 1 mol/L $(NH_4)_2CO_3$ was added dropwise slowly, and the mixture was stirred for another 3 hours, then the resulted precipitate was placed in an oven for drying, it was subjected to heat treatment at 800° C. for 2 h, then placed in an agate mortar and ground until mixed uniformly, the obtained powder was transferred to an alundum crucible, then sintered at 1450° C. for 4 h in a tubular furnace under a weakly reducing atmosphere consisting of 95% of $N_2$ and 5% of $H_2$ in volume for reduction, then cooled to room temperature to give an Ag nanoparticles doped luminescent material of $(Sr_{0.98}EU_{0.02})_3SiO_5:@Ag_{0.0005}$.

Example 3

Preparation Of Au Nanoparticles Doped Material Of $(Ba_{0.05}Sr_{0.949}EU_{0.001})_3SiO_5: F_{0.5}@Au_{0.0001}$ At room temperature, 0.15 g polyvinyl pyrrolidone was weighed and dissolved in 4 ml of deionized water, after dissolution 6 ml suspension of $1\times10^{-4}$ mol/L Au metal nanoparticles was added, and stirred for 12 h, then 35 ml of absolute ethanol, 10 ml of aqueous ammonia, 1.5 ml tetraethyl orthosilicate were added successively with stirring; after 4 h of reaction, the pH of the resulted solution was adjusted to 5, then 15.6 ml of 1 mol/L $Sr(NO_3)_2$, 1.8 ml of 0.5 mol/L $Ba(NO_3)_2$, 1.8 ml of 0.01 mol/L $Eu(NO_3)_3$, 3 ml of 0.5 mol/L $SrF_2$ in solutions were added, after stirring 45 ml of 0.5 mol/L $(NH_4)_2CO_3$ solution was added dropwise slowly, and the mixture was stirred for another 2 hours, then the obtained precipitate was placed in an oven for drying, it was subjected to heat treatment at 1000° C. for 4 h, then placed in an agate mortar and ground until mixed uniformly, and the obtained powder was transferred to an alundum crucible, then sintered at 1300° C. for 8 h in a tubular furnace under reducing atmosphere of $H_2$ for reduction, then it was cooled to room temperature to give an Au nanoparticles doped luminescent material of $(Ba_{0.05}Sr_{0.949}EU_{0.001})_3SiO_5: F_{0.5}@Au_{0.001}$.

Example 4

Figure 2:
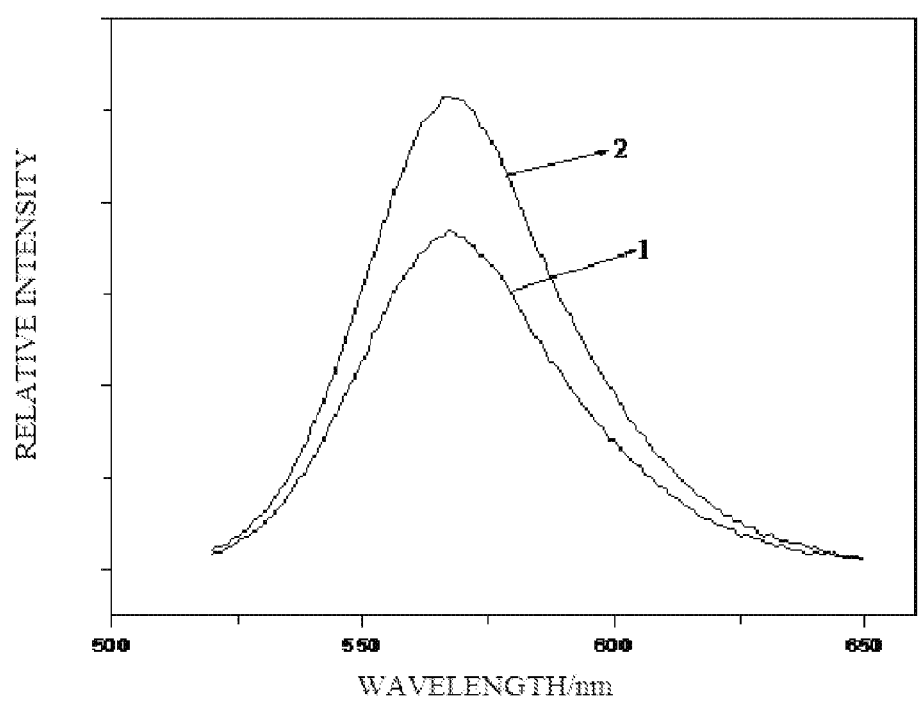
FIG. 2 shows the comparison spectrum at 460 nm excitation of the luminescent material prepared in Example 4 according to the present invention, wherein the curve 1 is the emission spectrum of the non Ag metal nanoparticles coated luminescent material of $(Sr_{0.97}EU_{0.03})_3SiO_5:F_{0.15}$, and the curve 2 is the emission spectrum of the Ag metal nanoparticles coated luminescent material of $(Sr_{0.97}EU_{0.03})_3SiO_5:F_{0.15}@Ag_{2.5\times10^{-4}}$.

Preparation Of Ag Nanoparticles Doped Material Of $(Sr_{0.97}Eu_{0.03})_3SiO_5:F_{0.15}@Ag_{0.00025}$ At room temperature, 0.10 g polyvinyl pyrrolidone was weighed and dissolved in 9 ml of deionized water, after dissolution 1 ml suspension of $1\times10^{-3}$ mol/L metal nano-particles was added, and stirred for 12 h, then 25 ml of absolute ethanol, 6 ml of aqueous ammonia, 1.0 ml tetraethyl orthosilicate were added successively with stirring; after 3 h of reaction, the pH of the resulted solution was adjusted to 5, then 11.4 ml of 1 mol/L $Sr(NO_3)_2$, 3.6 ml of 0.1 mol/L $Eu(NO_3)_3$, 3 ml of 0.1 mol/L $SrF_2$ in solutions were added, after stirring 15 ml of 1 mol/L $(NH_4)_2CO_3$ was added dropwise slowly, and the mixture was stirred for another 3 hours, then the obtained precipitate was placed in an oven for drying, it was subjected to heat treatment at 800° C. for 2h, then placed in an agate mortar and ground until mixed uniformly, and the resulted powder was transferred to an alundum crucible, then sintered at 1450° C. for 4 h in a tubular furnace under weakly reducing atmosphere consisting of 95% of $N_2$ and 5% of $H_2$ in volume for reduction, then it was cooled to room temperature to give an Ag nanoparticles doped luminescent material of $(Sr_{0.97} EU_{0.03})_3SiO_5:F_{0.15}@Ag_{0.00025}$. FIG. 2 shows the comparison spectra at 460 nm excitation of the Ag metal nanoparticles doped luminescent material of $(Sr_{0.97} Eu_{0.03})_3SiO_5:F_{0.15}@Ag_{0.00025}$ prepared in this Example and non metal nanoparticles doped luminescent material of $(Sr_{0.97}Eu_{0.03})_3SiO_5:F_{0.15}$, the emission peak at 568 nm may be seen in this figure, compared to the non metal nanoparticles doped sample, the luminous intensity of the metal nanoparticles doped luminescent material was enhanced by 45%, and the luminescent material prepared in this Example has the characteristics of good stability, good color purity and high luminous efficiency.

Example 5

Preparation Of Ag Nanoparticles Doped Material Of $(Ca_{0.5}Sr_{0.45}Eu_{0.05})_3SiO_5@Ag_{0.005}$ At room temperature, 0.08 g of polyvinyl pyrrolidone was weighed and dissolved in 8 ml of deionized water, after dissolution 2 ml suspension of $1\times10^{-2}$ mol/L Ag metal nanoparticles was added, and stirred for 18 h, then 20 ml of absolute ethanol, 4 ml of aqueous ammonia, 1.0 ml tetraethyl orthosilicate were added successively with stirring; after 6 h of reaction, the pH of the resulted solution was adjusted to 5, then 10.8 ml of 0.5 mol/L $Sr(NO_3)_2$, 12 ml of 0.5 mol/L $Ca(NO_3)_2$, 3 ml of 0.2 mol/L $Eu(NO_3)_3$ in solutions were added, after stirring 15 ml of 1 mol/L $(NH_4)_2CO_3$ was added dropwise slowly, and the mixture was stirred for another 3 hours, then the obtained precipitate was placed in an oven for drying, it was subjected to heat treatment at 900° C. for 5 h, then placed in an agate mortar and ground until mixed uniformly, and the resulted powder was transferred to an alundum crucible, then sintered at 1350° C. for 6 h in a tubular furnace under weakly reducing atmosphere consisting of 95% of $N_2$ and 5% of $H_2$ in volume for reduction, then it was cooled to room temperature to give an Ag nanoparticles doped luminescent material of $(Ca_{0.5}Sr_{0.45} EU_{0.05})_3 SiO_5@Ag_{0.005}$.

Example 6

Preparation Of Cu Nanoparticles Doped Material Of $(Ba_{0.075}Mg_{0.025}Sr_{0.75}Eu_{0.15})_3SiO_5:Cl_{0.01}@Cu_{0.00125}$

At room temperature, 0.18 g of PVP was weighed and dissolved in 8 ml of deionized water, after dissolution 2 ml suspension of $3 \times 10^{-3}$ mol/L Cu metal nanoparticles was added, and stirred for 24 h, then 30 ml of absolute ethanol, 8 ml of aqueous ammonia, 1.2 ml tetraethyl orthosilicate were added successively with stirring; after 2 h of reaction, the pH of the resulted solution was adjusted to 5, then 10.8 ml of 1 mol/L $Sr(NO_3)_2$, 5.4 ml of 0.2 mol/L $Ba(NO_3)_2$, 3.6 ml of 0.1 mol/L $Mg(NO_3)_2$, 5.4 mL of 0.4 mol/L $Eu(NO_3)_3$, 4 ml of 0.01 mol/L $SrCl_2$ in solutions were added, after stirring 18 ml of 1 mol/L $(NH_4)_2CO_3$ was added dropwise slowly, and the mixture was stirred for another 5 hours, then the obtained precipitate was placed in an oven for drying, it was subjected to heat treatment at 700° C. for 6 h, then placed in an agate mortar and ground until mixed uniformly, and the resulted powder was transferred to an alundum crucible, then sintered at 1350° C. for 6 h in a tubular furnace under weakly reducing atmosphere consisting of 95% of $N_2$ and 5% of $H_2$ in volume for reduction, then it was cooled to room temperature to give a Cu nanoparticles doped luminescent material of $(Ba_{0.075}Mg_{0.025}Sr_{0.75}Eu_{0.15})_3SiO_5:Cl_{0.01}@Cu_{0.00125}$.

Example 7

Preparation Of Pd Nanoparticles Doped Material Of $(Ba_{0.2}Zn_{0.1}Sr_{0.69}Eu_{0.01})_3SiO_5@Pd_{0.0003}$

At room temperature, 0.5 g of PVP was weighed and dissolved in 10 ml of deionized water, after dissolution 4 ml suspension of $3 \times 10^{-4}$ mol/L Au metal nano-particles was added, and stirred for 24 h, then 28 ml of absolute ethanol, 7 ml of aqueous ammonia, 1.0 ml tetraethyl orthosilicate were added successively with stirring; after 4 h of reaction, the pH of the resulted solution was adjusted to 5, then 8.3 ml of 1 mol/L $Sr(NO_3)_2$, 6 ml of 0.4 mol/L $Ba(NO_3)_2$, 6 ml of 0.2 mol/L $Zn(NO_3)_2$, 1.2 mL of 0.1 mol/L $Eu(NO_3)_3$ in solutions were added, after stirring 30 ml of 0.5 mol/L $(NH_4)_2CO_3$ was added dropwise slowly, and the mixture was stirred for another 3 hours, then the obtained precipitate was placed in an oven for drying, it was subjected to heat treatment at 600° C. for 8 h, then placed in an agate mortar and ground until mixed uniformly, and the resulted powder was transferred to an alundum crucible, then sintered at 1500° C. for 3 h in a tubular furnace under weakly reducing atmosphere consisting of 95% of $N_2$ and 5% of $H_2$ in volume for reduction, then it was cooled to room temperature to give a Pd nanoparticles doped luminescent material of $(Ba_{0.2}Zn_{0.1}Sr_{0.69}Eu_{0.01})_3SiO_5@Pd_{0.0003}$.

Example 8

Preparation Of Ag And Au Nanoparticles Doped material of $(Mg_{0.1}Sr_{0.84}Eu_{0.06})_3SiO_5: F_{0.1}@(Ag_{0.5}/Au_{0.5})_{0.002}$

At room temperature, 0.15 g of PVP was weighed and dissolved in 6 ml of deionized water, after dissolution 4 ml suspension of $2 \times 10^{-3}$ mol/L $Ag_{0.5}/Au_{0.5}$ nanoparticles was added, and stirred for 15 h, then 30 ml of absolute ethanol, 7 ml of aqueous ammonia, 1.0 ml tetraethyl orthosilicate were added successively with stirring; after 6 h of reaction, the pH of the resulted solution was adjusted to 5, then 19.8 ml of 0.5 mol/L $Sr(NO_3)_2$, 6 ml of 0.2 mol/L $Mg(NO_3)_2$, 3.6 ml of 0.2 mol/L $Eu(NO_3)_3$, 4 ml of 0.05 mol/L $SrF_2$ in solutions were added, after stirring 15 ml of 1 mol/L $(NH_4)_2CO_3$ was added dropwise slowly, and the mixture was stirred for another 4 hours, then the obtained precipitate was placed in an oven for drying, it was subjected to heat treatment at 900° C. for 3 h, then placed in an agate mortar and ground until mixed uniformly, and the resulted powder was transferred to an alundum crucible, then sintered at 1400° C. for 5 h in a tubular furnace under weakly reducing atmosphere consisting of 95% of $N_2$ and 5% of $H_2$ in volume for reduction, then it was cooled to room temperature to give an $(Ag_{0.5}/Au_{0.5})$ nanoparticles doped luminescent material of $(Mg_{0.1}Sr_{0.84}Eu_{0.06})_3SiO_5:F_{0.10}@(Ag_{0.5}/Au_{0.5})_{0.002}$.

The above embodiments are merely the preferable embodiments of the present invention and not intended to limit the present invention. And all changes, equivalent substitution and improvements which come within the meaning and range of equivalency of the present invention are intended to be embraced therein.

What is claimed is:

1. A preparation method of a metal nanoparticles doped silicate luminescent material of the present invention, comprising:
    step one: a metal salt solution, an additive and a reductant are mixed together and reacted with each other to give a metal nanoparticle colloid, wherein the metal is one or two selected from the group consisting of Ag, Au, Pt, Pd, and Cu;
    step two: the metal nanoparticle colloid is subjected to surface treatment by adding a solution containing a surface treating agent thereto, then an absolute ethanol, a deionized water, an aqueous ammonia, and a tetraethyl orthosilicate are added to coat the nanoparticles in the colloid to prepare $SiO_2$ coated nanospheres, and the acidity of the solution is adjusted to pH 5;
    step three: a nitrate solution of Sr, A, and Eu, as well as a nitric acid solution or aqueous solution of $SrD_2$ or $AD_2$ are added into the solution obtained in step two in accordance with the stoichiometric ratio of the corresponding elements in the general formula of $(Sr_{1-x-y}A_xEu_y)_3SiO_5:D_z@M_n$, wherein A is one selected from alkaline earth metal elements, D is F or Cl, the value of x is: $0 \leq x \leq 0.5$, the value of y is: $0.001 < y \leq 0.15$, the value of z is: $0 \leq z \leq 0.5$, then a precipitating agent is added, after stirring, the precipitate is dried to obtain a precursor;
    step four: the precursor is subjected to heat treatment and reduction treatment, then it is cooled to give the metal nanoparticles doped silicate luminescent material.

2. The preparation method of claim 1, wherein in step one, the additive is one or more selected from the group consisting of polyvinylpyrrolidone, sodium citrate, cetyl trimethyl ammonium bromide, sodium dodecyl sulfate and sodium dodecyl sulfonate, and the additive is added in such an amount that the content thereof in the final metal nanoparticle colloid is in the range of $1 \times 10^{-4}$ g/ml to $5 \times 10^{-2}$ g/ml.

3. The preparation method of claim 1, wherein in step one, the reductant is one or more selected from the group consisting of hydrazine hydrate, ascorbic acid, sodium citrate, and sodium borohydride, and the reductant is added in such an amount that the molar ratio of the reductant to the metal ions is in the range of 3.6:1 to 18:1.

4. The preparation method of claim 1, wherein in step two, the surface treating agent in the solution containing a surface treating agent is polyvinylpyrrolidone, the solvent is water, and the concentration of the surface treating agent is in the range of 0.005 to 0.1g/ml.

5. The preparation method of claim 1, wherein the precipitating agent in step three is ammonium carbonate, and the ammonium carbonate is in excess of 25% in the amount of substance in the solution of step three.

6. The preparation method of claim 1, wherein the heat treatment in step four is that the precursor being placed in a muffle furnace at 600° C. to 1000° C. for 2 to 10 hours.

7. The preparation method of claim 1, wherein the reduction treatment in step four is that the heat treated precursor being reduced at 1300° C. to 1600° C. for 1 to 8 hours in reducing atmosphere, and the reducing atmosphere is one or more selected from the group consisting of a mixed gas of nitrogen and hydrogen, carbon monoxide, and pure hydrogen.

* * * * *